(12) United States Patent
Razavi Majomard et al.

(10) Patent No.: US 12,021,670 B2
(45) Date of Patent: Jun. 25, 2024

(54) EQUALIZATION IN HIGH-SPEED DATA CHANNEL HAVING SPARSE IMPULSE RESPONSE

(71) Applicant: Marvell Asia Pte Ltd, Singapore (SG)

(72) Inventors: Seid Alireza Razavi Majomard, Belmont, CA (US); David Shen, Saratoga, CA (US); Ragnar Hlynur Jonsson, Aliso Viejo, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/333,248

(22) Filed: Jun. 12, 2023

(65) Prior Publication Data
US 2023/0336384 A1    Oct. 19, 2023

Related U.S. Application Data

(63) Continuation of application No. 17/451,869, filed on Oct. 22, 2021, now Pat. No. 11,677,595.

(60) Provisional application No. 63/105,127, filed on Oct. 23, 2020.

(51) Int. Cl.
*H04L 25/03* (2006.01)
(52) U.S. Cl.
CPC .............................. *H04L 25/03885* (2013.01)
(58) Field of Classification Search
CPC .................................................. H04L 25/03885
See application file for complete search history.

(56) References Cited

U.S. PATENT DOCUMENTS

| | | | |
|---|---|---|---|
| 3,368,168 A | | 2/1968 | Lucky et al. |
| 4,805,215 A | * | 2/1989 | Miller ...................... H04B 3/23 |
| | | | 370/290 |
| 7,446,622 B2 | | 11/2008 | Chiang |
| 7,831,646 B1 | | 11/2010 | Lam et al. |
| 9,137,056 B1 | | 9/2015 | Spaete, Jr. et al. |
| 11,411,604 B2 | * | 8/2022 | Fung ...................... H04L 27/144 |
| 2001/0026197 A1 | | 10/2001 | Tomisato et al. |
| 2003/0206579 A1 | | 11/2003 | Bryant |
| 2004/0179483 A1 | * | 9/2004 | Perlow .............. H04L 25/03057 |
| | | | 370/278 |

(Continued)

FOREIGN PATENT DOCUMENTS

| | | | | |
|---|---|---|---|---|
| CA | 2 649 659 | | 9/1999 | |
| EP | 2897335 A1 | * | 7/2015 | ............... H04B 3/30 |
| WO | WO-2004036746 A1 | * | 4/2004 | ......... H03H 17/0219 |

*Primary Examiner* — Freshteh N Aghdam

(57) ABSTRACT

A physical layer transceiver, for connecting a host device to a wireline channel medium that is divided into a total number of link segments, includes a host interface for coupling to a host device, a line interface for coupling to the wireline channel medium, and feed-forward equalization (FFE) circuitry operatively coupled to the line interface to add back, into a signal, components that were scattered in time. Respective individual filter segments are selectably configurable, by adjustment of respective delay lines, to correspond to respective individual link segments. The FFE circuitry also includes control circuitry configured to detect a signal energy peak in at least one particular link segment and, upon detection of the signal energy peak in the particular link segment, configure a respective one of the respective individual filter segments, by adjustment of a respective delay line, to correspond to the respective particular link segment.

22 Claims, 7 Drawing Sheets

(56) References Cited

U.S. PATENT DOCUMENTS

| | | |
|---|---|---|
| 2005/0053129 A1 | 3/2005 | Yousef |
| 2007/0133671 A1 | 6/2007 | Tsai |
| 2007/0258517 A1 | 11/2007 | Rollings et al. |
| 2007/0280388 A1 | 12/2007 | Torre et al. |
| 2013/0230092 A1* | 9/2013 | Prokop ............. H04L 25/03044 |
| | | 375/232 |
| 2013/0251019 A1 | 9/2013 | Kolze |
| 2015/0326348 A1* | 11/2015 | Shen ................... H04L 1/0041 |
| | | 714/776 |
| 2021/0218606 A1 | 7/2021 | Shen et al. |
| 2022/0150093 A1 | 5/2022 | Dabak et al. |

* cited by examiner

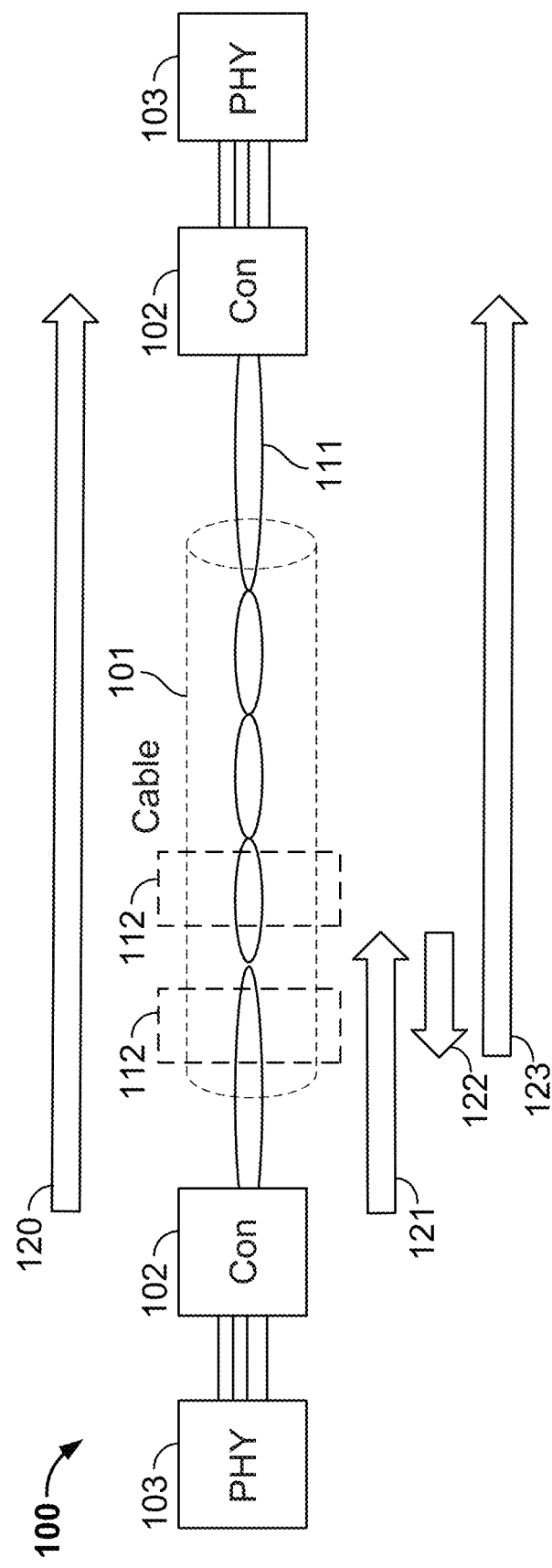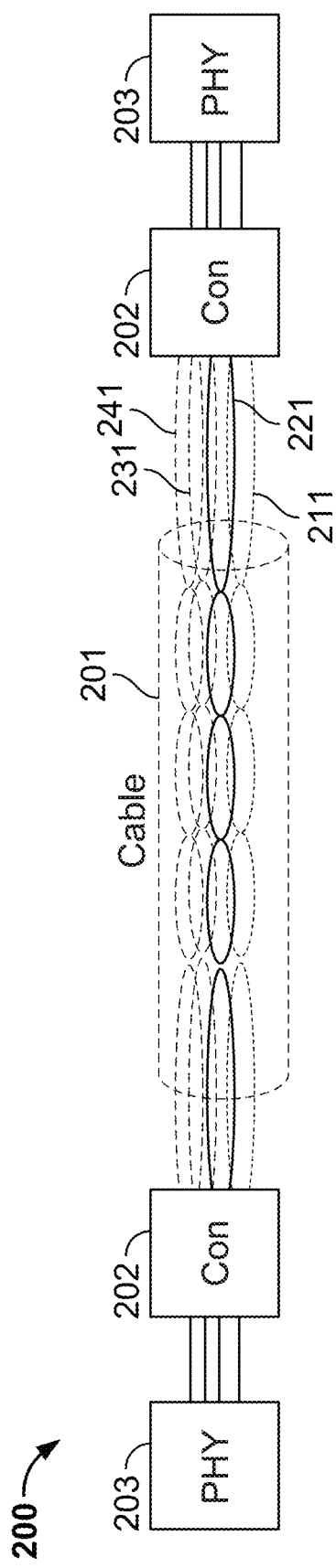

EQUALIZATION IN HIGH-SPEED DATA CHANNEL HAVING SPARSE IMPULSE RESPONSE

CROSS REFERENCE TO RELATED APPLICATION

This is a continuation of commonly-assigned U.S. patent application Ser. No. 17/451,869, filed Oct. 22, 2021 (now U.S. Pat. No. 11,677,595), which claims the benefit of commonly-assigned U.S. Provisional Patent Application No. 63/105,127, filed Oct. 23, 2020, each of which is hereby incorporated by reference herein in its respective entirety.

FIELD OF USE

This disclosure relates to the configuration of filters for equalization of a high-speed data channel. More particularly, this disclosure relates to the distribution of filter taps in a high-speed data channel having sparse impulse response.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Physical layer (PHY) devices for high-speed wireline serial communications, such as 1000 Base-T or 10G Base-T lines, typically use adaptive filters for equalization. A typical adaptive filter may include feed-forward equalizer (FFE) circuitry. The adaptive filter may have a plurality of taps, with each tap covering a segment of the equalizer circuitry, corresponding to a respective segment of the wireline link. The coefficients of each segment are adapted with an algorithm such as, e.g., least-mean-squares, to maximize the effectiveness of the equalizer circuitry. In some relatively long-reach equalization scenarios—i.e., where the link partners are not located on a single chip or circuit board, there may be relatively long lengths of cable along which only relatively few points require equalization, with the rest of the cable being relatively quiet. The impulse response of such a link may be referred to as "sparse." This may particularly be the case for a channel with localized strong impairments, where the link requires equalization only in the vicinity of the impairments. A sparse impulse response can lead to large inter-symbol interference (ISI), which limits the signal-to-noise-and-interference ratio (SNIR) and reduces channel performance.

Because equalization filters are relatively expensive, and consume relatively large amounts of power, it is not practical or desirable to provide sufficient filter taps to cover an entire long-reach link. However, there may be adverse consequences to not filtering particular link segments. For example, if a minor signal peak away from the main peak of a signal is caused by reflection of a portion of the signal, it could be advantageous to include that minor signal peak as part of the total signal power, increasing the SNIR. But without a feed-forward equalization filter, that minor signal peak may be discounted as noise and discarded.

SUMMARY

In accordance with implementations of the subject matter of this disclosure, a physical layer transceiver, for connecting a host device to a wireline channel medium that is divided into a total number of link segments, includes a host interface for coupling to a host device, a line interface for coupling to the wireline channel medium, and feed-forward equalization circuitry operatively coupled to the line interface to add back, into a signal, components that were scattered in time. The feed-forward equalization circuitry includes a plurality of filter segments. Respective individual filter segments in the plurality of filter segments are selectably configurable, by adjustment of respective delay lines, to correspond to respective individual link segments of the total number of link segments. The feed-forward equalization circuitry also includes control circuitry configured to detect a signal energy peak in at least one particular link segment of the total number of link segments, and, upon detection of the signal energy peak in a respective one of the at least one particular link segment of the total number of link segments, configure a respective one of the respective individual filter segments in the plurality of filter segments, by adjustment of a respective delay line, to correspond to the respective one of the at least one particular link segment of the total number of link segments.

In a first implementation of such a physical layer transceiver, the plurality of filter segments may be fewer in number than a total number of link segments of the wireline channel medium.

In a first implementation of such a physical layer transceiver, the plurality of filter segments may include a plurality of rover filter segments each of which is selectably configurable, using a respective delay line, to filter a respective selectable link segment of the total number of link segments, and the control circuitry is configured to detect the signal energy peak in at least one particular link segment of the total number of link segments by selectively advancing an unused rover filter segment of the plurality of rover filter segments through the link segments by adjustment of a respective delay line, and to measure transmission conditions of each link segment of the total number of link segments as the unused rover filter segment passes through the link segments.

A third implementation of such a physical layer transceiver may include correlation circuitry configured to calculate a correlation between received data and one or more errors in the received data. The control circuitry may be configured to determine, from the correlation, the signal energy peak in at least one particular link segment of the total number of link segments.

In a fourth implementation of such a physical layer transceiver, the control circuitry may be configured to, upon detection of the signal energy peak in a respective one of the at least one particular link segment of the total number of link segments, adjust gain of the respective one of the individual filter segments in the plurality of filter segments that corresponds to the respective one of the at least one particular link segment of the total number of link segments.

According to an aspect of that fourth implementation, the control circuitry may be configured to adjust gain of the respective one of the individual filter segments in the plurality of filter segments that corresponds to the respective one of the at least one particular link segment of the total number of link segments, by configuring at least one additional respective one of the respective individual filter segments in the plurality of filter segments to correspond to the respective one of the at least one particular link segment of the total number of link segments.

In a fifth implementation of such a physical layer transceiver, the control circuitry may be further configured to, when segments in which signal energy peaks are detected number fewer than the plurality of filter segments, power down ones of the plurality of filter segments that are not configured to correspond to the respective one of the at least one particular link segment of the total number of link segments.

A method according to implementations of the subject matter of this disclosure filter a wireline channel medium that is divided into a total number of link segments, the wireline channel medium having filter circuitry including a plurality of filter segments, respective individual filter segments in the plurality of filter segments being configurable to correspond to respective individual link segments of the total number of link segments. The method includes detecting a signal energy peak in at least one particular link segment of the total number of link segments, and upon detecting the signal energy peak in a respective one of the at least one particular link segment of the total number of link segments, configuring a respective one of the respective individual filter segments in the plurality of filter segments to correspond to the respective one of the at least one particular link segment of the total number of link segments.

In a first implementation of such a method, where the plurality of filter segments includes a plurality of rover filter segments each of which is selectably configurable, by adjustment of a respective delay line, to filter a respective link segment of the total number of link segments, detecting the signal energy peak in at least one particular link segment of the total number of link segments may include selectively advancing, by adjustment of a respective delay line, an unused rover filter segment of the plurality of rover filter segments through the link segments, and measuring transmission conditions of each link segment of the total number of link segments as the unused rover filter segment passes through the link segments.

In a second implementation of such method, detecting the signal energy peak in at least one particular link segment of the total number of link segments may include calculating a correlation between received data and one or more errors in the received data, and determining, from the correlation, the signal energy peak in at least one particular link segment of the total number of link segments.

A third implementation of such a method may further include, upon detecting the signal energy peak in a respective one of the at least one particular link segment of the total number of link segments, adjusting gain of the respective one of the individual filter segments in the plurality of filter segments that corresponds to the respective one of the at least one particular link segment of the total number of link segments.

According to a first aspect of that third implementation, adjusting gain of the respective one of the individual filter segments in the plurality of filter segments, that corresponds to the respective one of the at least one particular link segment of the total number of link segments, may include configuring at least one additional respective one of the respective individual filter segments in the plurality of filter segments to correspond to the respective one of the at least one particular link segment of the total number of link segments.

A second aspect of that third implementation may further include, when segments in which signal energy peaks are detected number fewer than the plurality of filter segments, powering down ones of the plurality of filter segments that are not configured to correspond to the respective one of the at least one particular link segment of the total number of link segments.

A wireline communications system according to implementations of the subject matter of this disclosure includes a wireline channel medium that is divided into a total number of link segments, and a plurality of physical layer transceivers coupled to the wireline channel medium. Each respective one of the plurality of physical layer transceivers includes a respective host interface for coupling to a respective host device, a respective line interface for coupling to the wireline channel medium, and respective feed-forward equalization circuitry operatively coupled to the respective line interface to add back, into a signal, components that were scattered in time. The respective feed-forward equalization circuitry includes a plurality of filter segments, respective individual filter segments in the plurality of filter segments being selectably configurable, by adjustment of respective delay lines, to correspond to respective individual link segments of the total number of link segments. The respective feed-forward equalization circuitry also includes control circuitry configured to detect a signal energy peak in at least one particular link segment of the total number of link segments, and upon detection of the signal energy peak in a respective one of the at least one particular link segment of the total number of link segments, configure a respective one of the respective individual filter segments in the plurality of filter segments, by adjustment of a respective delay line, to correspond to the respective one of the at least one particular link segment of the total number of link segments.

In a first implementation of such a wireline communications system, in each respective physical layer transceiver, the plurality of filter segments may be fewer in number than a total number of link segments of the wireline channel medium.

In a second implementation of such a wireline communications system, in each respective physical layer transceiver, the plurality of filter segments may include a plurality of rover filter segments each of which is selectably configurable, by adjustment of a respective delay line, to filter a respective link segment of the total number of link segments, and the control circuitry may be configured to detect the signal energy peak in at least one particular link segment of the total number of link segments by selectively advancing an unused rover filter segment of the plurality of rover filter segments through the link segments by adjustment of a respective delay line, and to measure transmission conditions of each link segment of the total number of link segments as the unused rover filter segment passes through the link segments.

In a third implementation of such a wireline communications system, each respective physical layer transceiver may include correlation circuitry configured to calculate a correlation between transmitted data and one or more errors in received data. The control circuitry may be configured to determine, from the correlation, the signal energy peak in at least one particular link segment of the total number of link segments.

In a fourth implementation of such a wireline communications system, in each respective physical layer transceiver, the control circuitry may be configured to, upon detection of the signal energy peak in a respective one of the at least one particular link segment of the total number of link segments, adjust gain of the respective one of the individual filter segments in the plurality of filter segments that corresponds to the respective one of the at least one particular link segment of the total number of link segments.

In a fifth implementation of such a wireline communications system, in each respective physical layer transceiver, the control circuitry may be configured to adjust gain of the respective one of the individual filter segments in the plurality of filter segments that corresponds to the respective one of the at least one particular link segment of the total number of link segments, by configuring at least one additional respective one of the respective individual filter segments in the plurality of filter segments, by adjustment of a respective delay line, to correspond to the respective one of the at least one particular link segment of the total number of link segments.

In a sixth implementation of such a wireline communications system, in each respective physical layer transceiver, the control circuitry may be further configured to, when segments in which signal energy peaks are detected number fewer than the plurality of filter segments, power down ones of the plurality of filter segments that are not configured to correspond to the respective one of the at least one particular link segment of the total number of link segments.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 1 is a representation of an Ethernet physical link, which may be an automotive Ethernet physical link, in which an implementation of the subject matter of this disclosure may be used;

FIG. 2 is a representation of an Ethernet physical link, which may be an enterprise Ethernet physical link, in which an implementation of the subject matter of this disclosure may be used;

DETAILED DESCRIPTION

Figure 3:
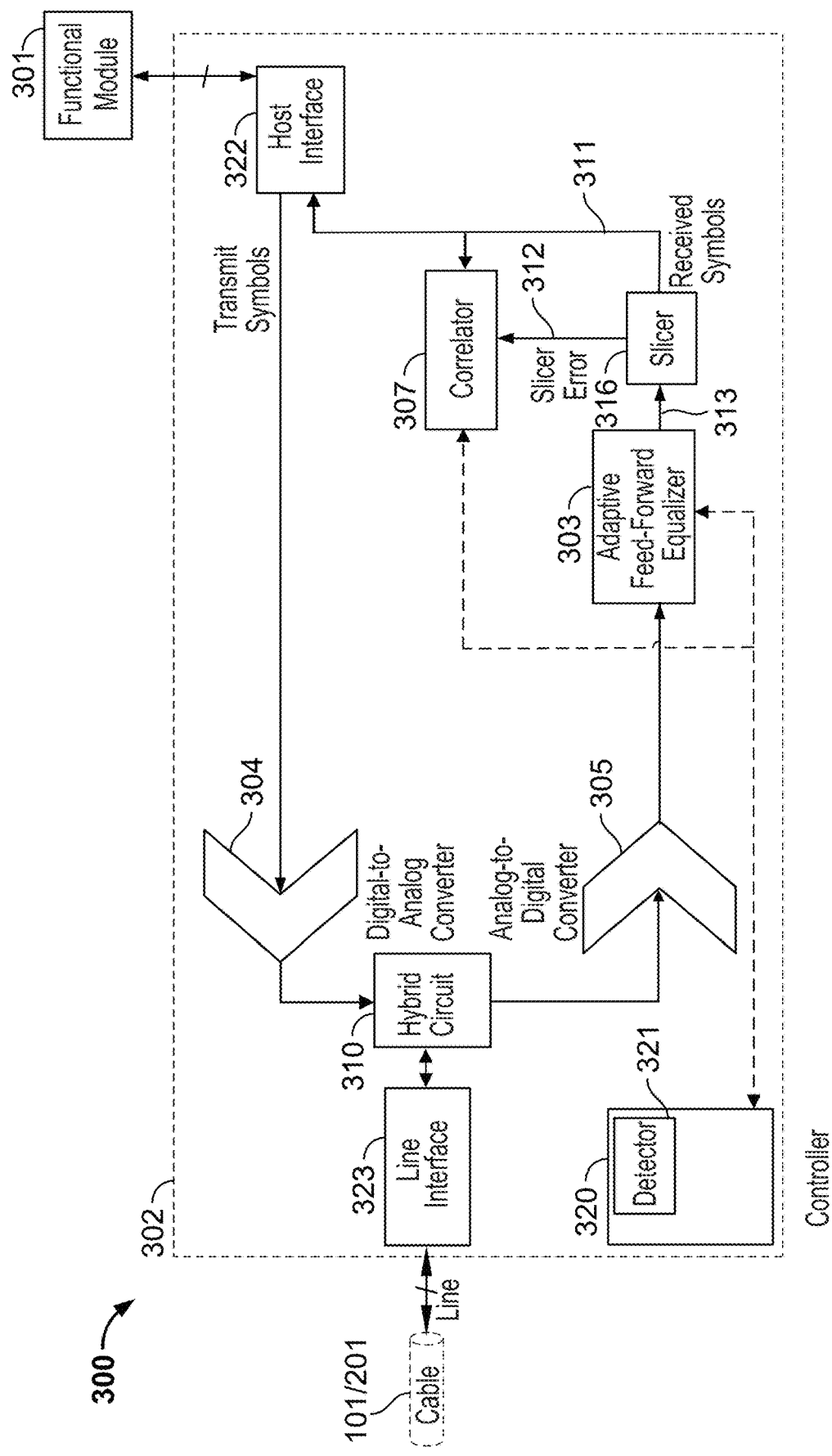
FIG. 3 is a modular diagram of a physical layer transceiver in accordance with implementations of the subject matter of this disclosure.

As noted above, physical layer devices for high-speed wireline serial communications, such as 1000 Base-T or 10G Base-T lines, typically use adaptive filters for equalization. A typical adaptive filter may include a plurality of taps, with each tap covering a segment of the equalization circuitry, corresponding to a respective segment of the wireline link. The coefficients of each segment are adapted with an algorithm such as, e.g., least-mean-squares, to maximize the effectiveness of the equalization circuitry.

Because equalization filters are relatively expensive, and consume relatively large amounts of power, it is not practical or desirable to provide sufficient filter taps to cover an entire long-reach link. However, there may be adverse consequences to not filtering particular link segments. For example, if a minor signal peak away from the main peak of a signal is caused by reflection of a portion of the signal, it could be advantageous to include that minor signal peak as part of the total signal power, thereby increasing the SNIR. But without a feed-forward equalization filter, that minor signal peak may be discounted as noise and discarded.

Therefore, in accordance with implementations of the subject matter of this disclosure, a feed-forward equalizer in a long-reach wireline link—i.e., a wireline link beyond the components of a single chip or circuit board—is provided with "rover" filter segments, which can be configured to cover different portions of the link. The rover filter segments may not physically move, but rather each respective rover filter segment is configured using a programmable delay line to change the respective portion of the link to which the respective rover filter segment corresponds. The rover filter segments may be configured during a training interval prior to run-time—i.e., before entering data mode—to filter link segments requiring equalization.

Filtering using feed-forward equalization avoids error propagation from one symbol to another that may occur when any form of feedback equalization (e.g., decision-feedback equalization, or DFE), with or without rover filter segments, because feedback equalization is performed only after a decision has been made (e.g., by a data slicer) based on data that has not yet been equalized. On the other hand, feed-forward equalization is performed before a decision is made, using later data that is "fed forward" (using suitable delay of the current data), and therefore the current decision is not affected by error fed back from a decision on unequalized data. Moreover, because feed-forward equalization adds back, into the signal, components that may have been scattered over time, using feed-forward equalization increases the signal power. Feed-forward equalization is therefore particularly beneficial for longer cables that can have more variability in the channel response, including more variability in delayed reflections.

The wireline connection in question may be, for example, a fixed cable in a data center which is normally under stable conditions. Under those conditions, large portions of the cable may be free of reflections and interference, but connectors, or bends in the cable, may cause reflections and additional interference in nearby portions of the cable. Such a link may be considered to have a sparse impulse response as defined above, and may require equalization only for link segments adjacent to cable connectors or bends in the cable where there may be signal artifacts on top of the intended signal.

Because such a cable normally does not move, it might be expected that the segments that require filtering will always be the same. Nevertheless, in accordance with implementations of the subject matter of this disclosure, on establishment of a new link on such a cable (e.g., on power-up), the link is measured (as described in more detail below), and FFE rover filter taps are moved (as noted above, this may not be actual physical movement) to segments of the link where signal energy peaks are detected.

In another situation, the wireline connection in question may be, for example, an automotive or other mobile Ethernet cable. Such a cable also may be susceptible to interference only near connectors or bends in the cable. However, if the cable is poorly or improperly secured to the vehicle, the cable may move (including possibly bending or kinking) as the vehicle accelerates or road surface conditions change. Moreover, the cable, along with the remainder of the vehicle, could be subject to large enough temperature variations— resulting, for example, from changing weather conditions and sun load—to change the physical cable configuration. Therefore, the cable segments that require equalization may be more likely to change from one establishment of a link to the next establishment of a link. In any case, as in the case of a more fixed cable, in accordance with implementations of the subject matter of this disclosure, on establishment of a new link on such a cable (e.g., on power-up), the link is measured (as described in more detail below), and FFE rover filter taps are moved to segments of the link where signal energy peaks are detected.

Whether in a fixed or mobile application, one function of the FFE rover segments is to make sure that the signal power of any peaks that derive from the intended signal (e.g., by reflection), as opposed to interference, is added back into the main signal path, while discarding interference peaks.

As used herein, "rover filter configuration" includes the number of active rover filter segments, and the programmed delay for each rover filter segment (which determines its "position" relative to a link segment). The rover filter configuration may also include the output gain and/or coefficient values of each rover filter segment. The rover filter configuration may be changed by changing the number of active rover filter segments (either increasing or decreasing that number), changing the position of an active rover filter segment (e.g., by adjusting its delay), or adjusting the gain of a particular rover filter segment (which may be achieved by placing a plurality of rover filter segments in parallel at a particular location).

As noted above, before the rover filter configuration can be established, conditions on the channel should be detected to identify locations along the channel having peaks of signal energy. In some implementations, such detection can be performed with a traveling "auxiliary" rover, or by calculating a correlation between the receive and transmit paths in the physical layer transceiver, both as described below.

Specifically, in an auxiliary rover filter implementation, an otherwise unused rover filter segment, which can be referred to as an auxiliary rover filter segment, can be "moved" through the link by continually adjusting the programmable delay line of the auxiliary rover filter segment. At each link segment location, the auxiliary rover filter segment is allowed to adapt and then a quality metric (such as the signal-to-noise ratio (SNR), the signal-to-noise-and-interference ratio (SNIR), the bit error rate, or the decoder workload) with the auxiliary rover filter segment present may be measured and compared to the same quality metric as measured before the auxiliary rover filter segment was added. If the quality metric improves when the auxiliary rover filter segment is present, a rover filter segment is assigned to that link segment location.

In a correlation implementation, a correlation operation may be performed between an uncorrected signal in the receive path of the physical layer transceiver, and the slicer error in the receive path of the physical layer transceiver, which may serve as a proxy for the transmit signal of the link partner (which is not available directly at the receiver). The correlation would show the delay and magnitude of unfiltered signal energy peaks. A rover filter segment may be added at locations where the unfiltered signal energy peak, as shown by the correlation output, is larger than a predetermined threshold. As a confirmation check, SNR or SNIR may be measured after adding the new rover filter segment at the location where the unfiltered signal energy peak is larger than a predetermined threshold. Only if SNR or SNIR improves more than a predetermined amount would the new rover filter segment be kept at that location where the unfiltered signal energy peak is larger than a predetermined threshold.

The subject matter of this disclosure may be better understood by reference to FIGS. 1-8.

Implementations of the subject matter of this disclosure may be found in the physical layer transceiver (PHY) of fixed Ethernet links (e.g., "enterprise," data center, cloud, carrier, or "metro" links), or in automotive or other mobile Ethernet links.

An automotive Ethernet physical link 100 in which an implementation of the subject matter of this disclosure may be used is shown in FIG. 1, connecting two physical layer transceivers 103, one of which may be located in an electronic control unit (ECU) of a vehicle, and another of which may be located in a functional module of the vehicle. Each PHY 103 is connected via a respective connector 102 to channel medium 101 which, in this implementation, may be a cable including a single shielded or unshielded twisted copper wire pair 111, or a coaxial cable or optical fiber.

Although single-cable physical link 100 also may be used in enterprise implementations, an enterprise Ethernet physical link 200 in which an implementation of the subject matter of this disclosure may be used is shown in FIG. 2, connecting two physical layer transceivers 203 corresponding to respective link partners, each of which may be located in a respective data processing or storage device. Each PHY 203 is connected via a respective connector 202 to channel medium 201 which, in this implementation, is a cable that may include four shielded or unshielded twisted copper wire pairs 211, 221, 231, 241, or four coaxial cables or optical fibers, or a mix thereof.

From the perspective of this disclosure, PHYs 103 and PHYs 203 are identical in relevant respects. An implementation of a PHY 300, shown in FIG. 3, may be used as either PHY 103 or PHY 203, for example.

PHY 300 couples a host device, such as functional module 301, which may be an automotive module, or a data processing or storage module of an enterprise system, to wireline channel medium (cable) 101/201, using encoding and decoding circuitry 302. One or more of adaptive filters, which may be feed-forward equalizers 303, filter the effects of interference and also redirect reflected data signals into the main signal path.

In some implementations according to the subject matter of this disclosure, PHY 300 transmits data from functional module 301 through host interface 322 and digital-to-analog converter 304 via hybrid circuit 310 and line interface 323 onto wireline channel medium (cable) 101/201, and receives from wireline channel medium (cable) 101/201, via line interface 323 and hybrid circuit 310, through analog-to-digital converter 305, a remote (target) signal. The received remote (target) signal is processed through adaptive filter circuitry that may include adaptive feed-forward equalizer 303. The transmitted signal is similarly filtered in another PHY 300 at the other end of wireline channel medium (cable) 101/201, where it is received as the remote (target) signal. Adaptive feed-forward equalizer 303 may be used to remove interference, but also to direct reflected peaks of the received data back into the main data path.

Although implementations of the subject matter of this disclosure are described herein in the context of a transceiver, the subject matter of this disclosure may also be used in a receiver, in which case the transmit path, including digital-to-analog converter 304, can be omitted along with hybrid circuit 310.

Adaptive feed-forward equalizer 303 may be implemented as rover filters. The programmable delay of each segment of rover filters 303 may be adjusted to "advance" or "move" each rover filter segment to correspond to a respective channel segment (also referred to as a "link segment"). As noted above, the rover filter segments may not physically move, but rather each respective rover filter segment is configured using a programmable delay line to change the respective portion of the link to which the respective rover filter segment corresponds. Controller 320, which may include detector circuitry 321, may adjust the filter configuration—including both the position and filter parameters of each segment—based on detected channel transmission conditions, as described in more detail below.

Figure 4:
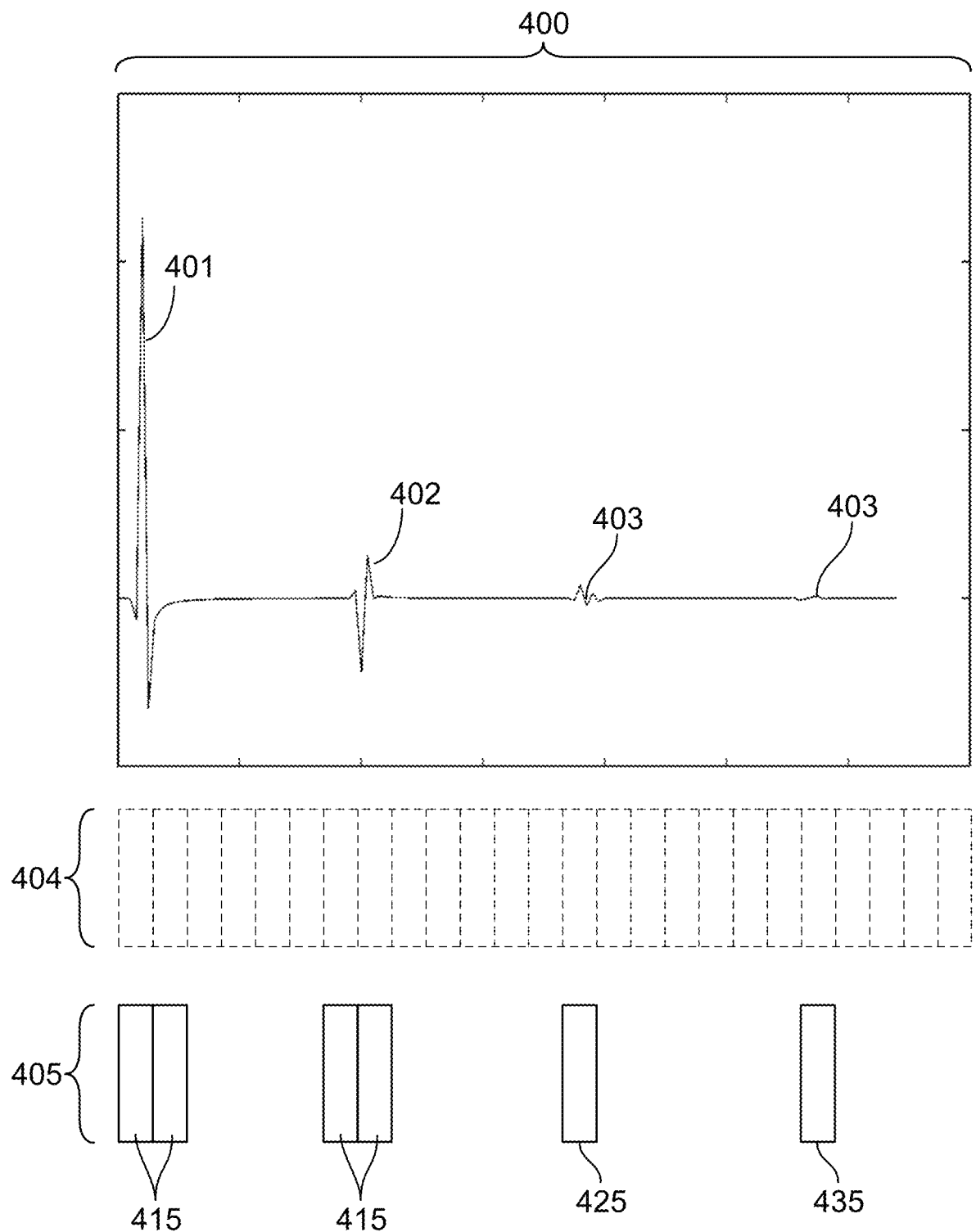
FIG. 4 shows the correspondence of respective filter segments to segments of a channel in accordance with implementations of the subject matter of this disclosure.

FIG. 4 shows the correspondence of respective filter segments to segments of a channel 400 in accordance with implementations of the subject matter of this disclosure. The signal energy on channel 400, which may include a main signal peak 401, as well as additional peaks 402, which may result from reflections of the signal, and other peaks 403 which may result from various other forms of interference. The majority of channel 400, can be expected to be relatively quiet, with neither signal reflections nor interference present.

As an example, for illustration purposes, the origin of reflection peaks 402 may be understood by reference to FIG. 1, where the transmitted signal is represented by arrow 120. If there are additional connectors 112 on the channel 101, a portion 121 of the signal 120, may be reflected back at 122 and then reflected forward at 123, giving rise to peaks 402 at each reflection.

Slots 404 represent locations to which filter segments may be assigned. These locations correspond to physical segments of the channel medium. As noted above, respective rover filter segments may be "advanced" or "moved" to various ones of slots 404 by adjusting a respective programmable delay line (again, as noted above, this may not be actual physical movement). Thus, rather than filling every slot 404 with a filter segment, which would result in an overdesigned implementation with excessive power consumption, rover filter segments can be selectively assigned to ones of filter slots 404 corresponding to channel segments requiring filtering, while other slots 404 are left without a filter segment.

For example, an arrangement 405 of active rover filter segments might be deployed to deal with a channel having the impulse profile seen in FIG. 4. In arrangement 405, most filter segments 415 are concentrated to correspond to the end of the channel, where, in addition to main signal peak 401, peak 402 representing reflection from connectors is present. Additional active rover filter segments 425, 435 are deployed to correspond to additional reflection peaks 403 that are located downstream of peaks 402.

Arrangement 405 might represent a rover filter configuration established when the channel link is established. That is, where slots 404 shown in broken line indicate potential locations of rover filters, the segments 415 shown in solid line represent locations where active rover filter segments are deployed.

As discussed above, detector circuitry 321 of controller 320 may measure the transmission conditions on channel 400, for the purpose of placing the rover filter segments, using either one or more traveling rover filter segments, or correlation.

In some implementations, detector circuitry 321 of controller 320 measures the transmission conditions on the channel using one or more traveling rover filter segments. An "additional," "extra," or "auxiliary" rover filter segment—i.e., a rover filter segment that is not already deployed to a specific channel segment location—can be temporarily deployed (e.g., sequentially) to each channel segment location as the traveling rover filter segment. Alternatively, the auxiliary rover filter segment can be temporarily deployed even to channel segments which are already filtered to test whether the existing filter segments are correct.

Figure 5:
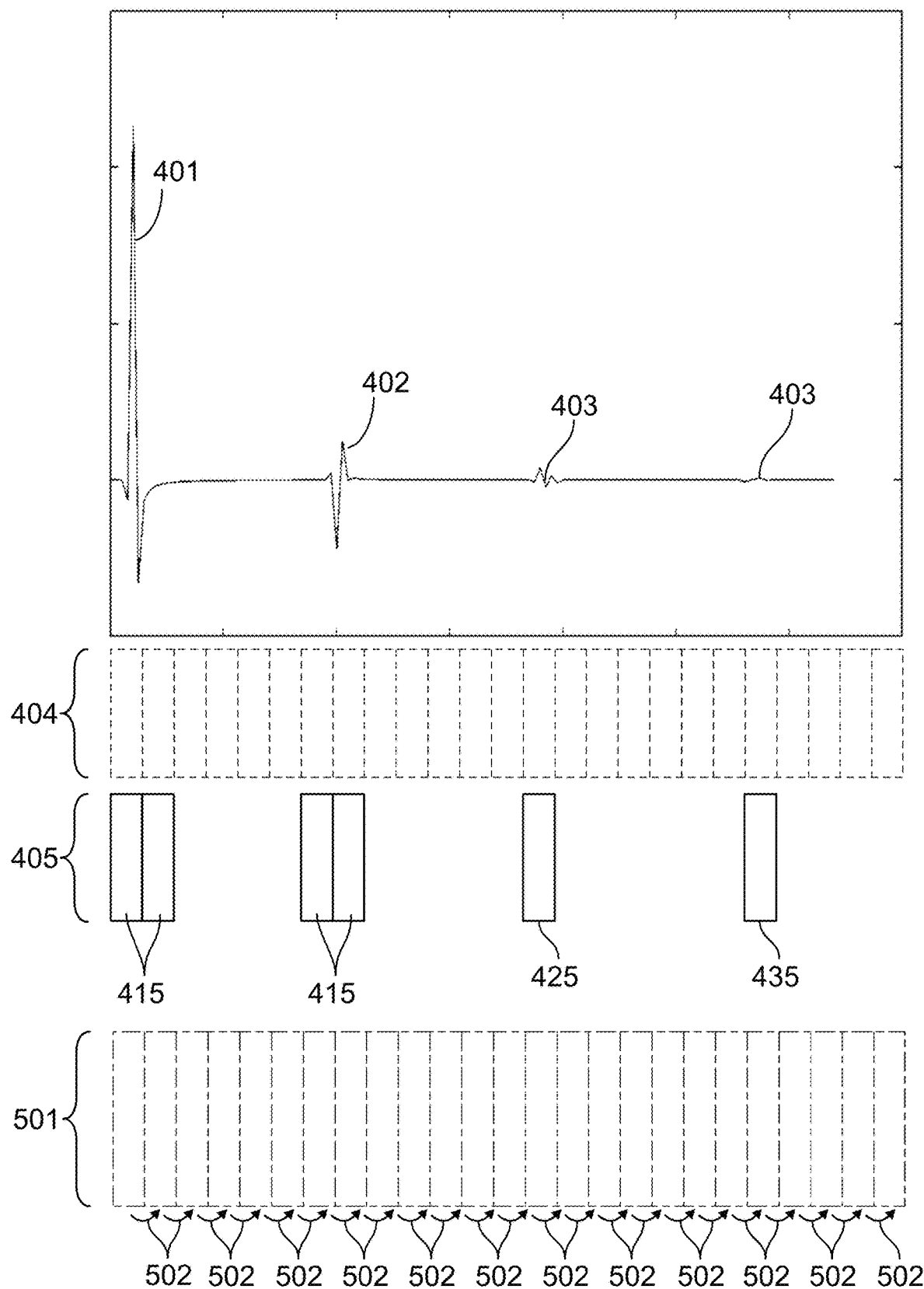
FIG. 5 illustrates a channel having a traveling auxiliary rover filter segment in accordance with implementations of the subject matter of this disclosure.

An "extra" "traveling" rover filter segment is depicted in FIG. 5, which is similar to FIG. 4, in that it shows rover filter segments 415, 425, 435 that have already been deployed. In addition, the traveling rover filter segment 501, which moves through all locations to detect new or increased interference requiring deployment of additional rover filter segments, is represented by a plurality of phantom filter segment locations, and arrows 502 indicate the "movement" of traveling rover filter segment 501 from one phantom filter segment location to another phantom filter segment location, under control of controller 320. If signal energy—which may be a reflection of the desired signal—is detected at an unfiltered channel segment location by traveling rover filter segment 501, a dedicated rover filter segment can be deployed to that channel segment location. If the channel impulse response depicted in FIGS. 4 and 5 were to change (not shown), so that signal energy is detected at a filtered channel segment location by traveling rover filter segment 501, whose function is detection, a new dedicated rover filter segment can be deployed to that channel segment location or the existing rover filter segment can be adjusted. Using feed-forward equalization, the dedicated rover filter segments, once placed, can detect reflected signal energy, which may be added to the main signal peak 401, while interference may be filtered out by other techniques such as echo cancellation.

In some other implementations, detector circuitry 321 of controller 320 measures the transmission conditions on the channel using correlation. Correlator 307 in physical layer transceiver 300 may be used to perform correlation between the received symbols 311 and the slicer error 312 derived by slicer 316 from the output 313 of adaptive feed-forward equalizer 303. Slicer error 312 in this case may serve as a proxy for the signal transmitted by the link partner (which is not available directly at the receiver). Alternatively (not shown), correlator 307 may perform a correlation between the slicer error 312 output by slicer 316 and the output 313 of adaptive feed-forward equalizer 303, which is the input of slicer 316 and represents a noisy version of the signal transmitted by the link partner.

As a further alternative (also not shown), the second input to correlator 307, in addition to the slicer error 312 output by slicer 316, can be the replica of a pseudorandom bit sequence (PRBS) sent by the link partner during training of the link. The seed of the PRBS generator can be estimated by receiver and used to regenerate the entire training sequence of the remote transmitter. That sequence can used in correlator 307 as an alternative to detected symbols to estimate the peaks of power in remote signal impulse response The correlation output will indicate the delay and magnitude of reflected signal energy or interference. A dedicated rover filter segment can be deployed to those channel segment locations at which reflected signal energy or interference, as indicated by the correlation output, is larger than a certain threshold.

According to implementations of the subject matter of this disclosure, whether the presence of signal energy at a channel segment is detected by a traveling rover filter segment 501, or by correlator 307, or by any other technique, after a dedicated rover filter segment has been deployed to that channel segment, then the quality metric (e.g., SNIR as discussed above) at that channel segment with the dedicated filter in place can be compared to the quality metric at that channel segment before the dedicated filter was deployed. If the presence of the dedicated filter has not improved the quality metric, then the dedicated filter can be removed, returning to the previous condition.

In one scenario, the link segment at which signal energy is detected could be a link segment not currently being equalized. In that scenario, a rover filter segment can be "moved" or advanced to correspond to the link segment requiring equalization by adjusting a programmable delay line, so that the energy in that segment can be added to the main signal.

In another scenario, the link segment at which a change in transmission conditions is detected could be a link segment that currently is being equalized, and still needs equalization, but the filter parameters (e.g., filter gain and/or coefficients) require adjustment. In some implementations, the filter segment in operation can be adjusted. In other implementations, rather than attempting to adjust a filter segment that is in operation, a new filter segment may be advanced to correspond to the link segment whose existing filter segment requires adjustment, and the existing filter segment may be advanced away from the link segment. In some such implementations, in order to prevent discontinuities in the transmission, gain of the new filter segment is gradually increased, while gain of the existing filter segment is gradually decreased, until the gain of the existing filter segment reaches zero and the existing filter segment can be advanced away from the link segment being equalized.

Figure 6:
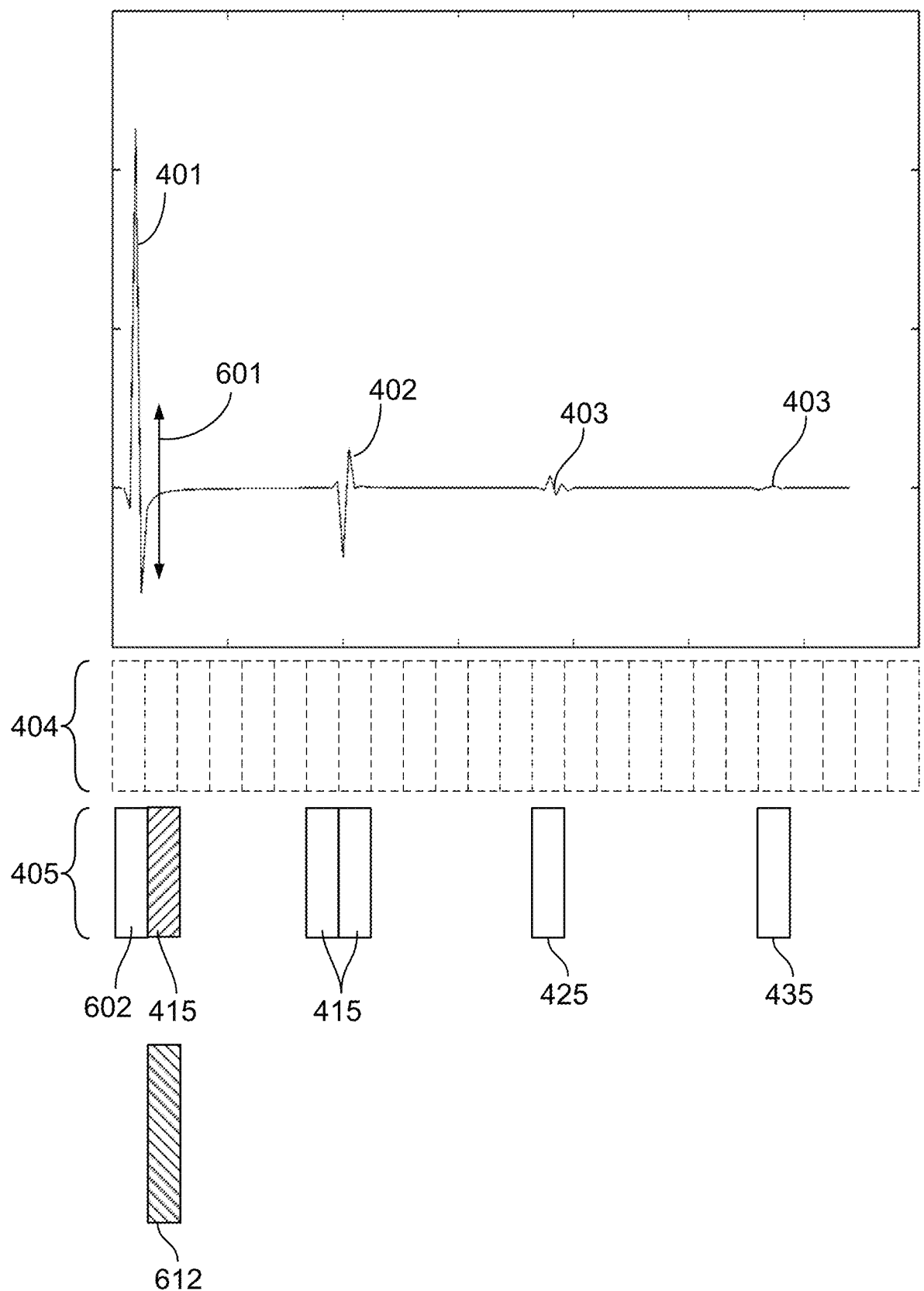
FIG. 6 shows the replacement of one filter segment with another in accordance with implementations of the subject matter of this disclosure.
Figure 7:
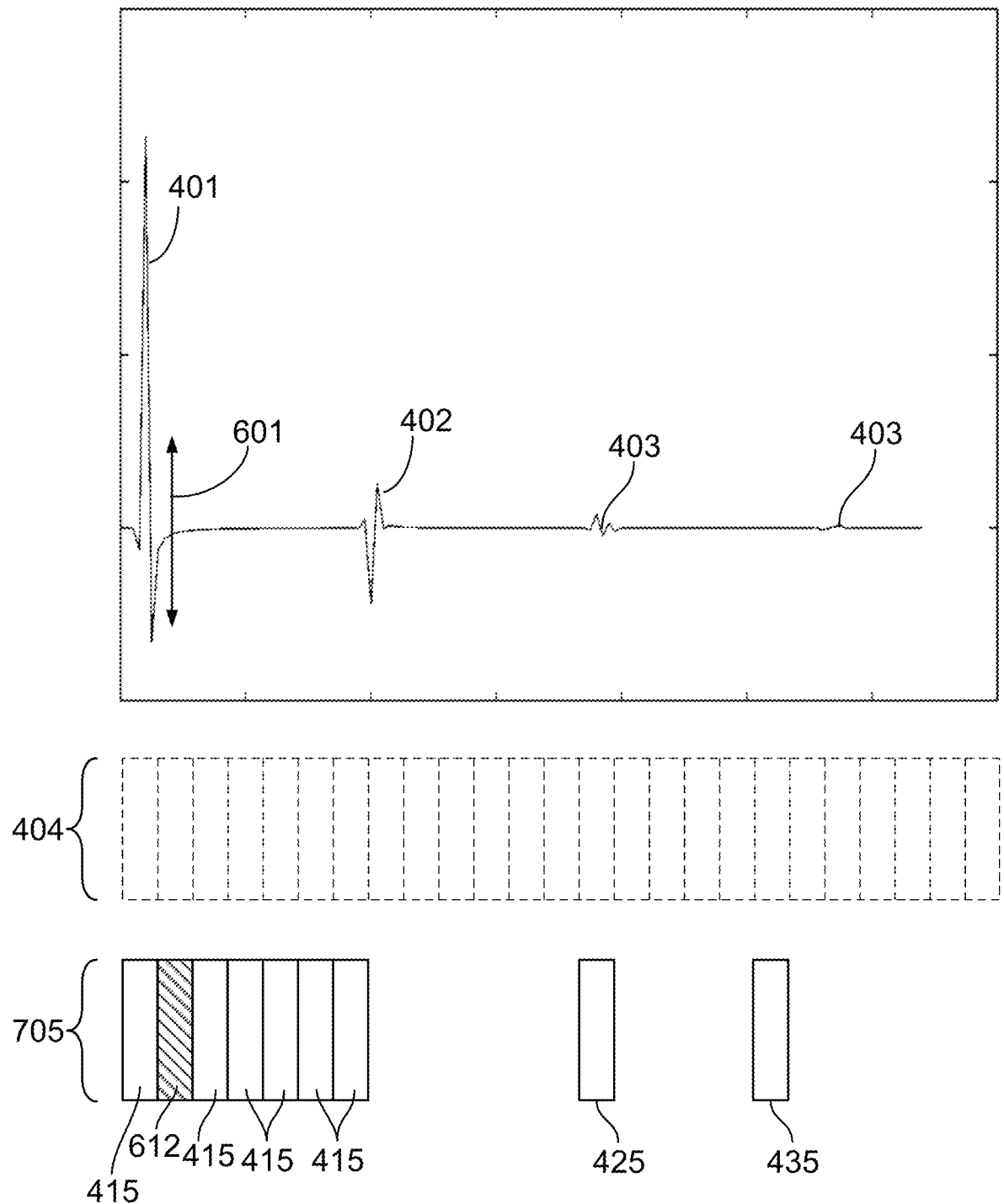
FIG. 7 shows the resulting channel after the replacement shown in FIG. 6.

An implementation in which an existing filter segment is adjusted by moving a new filter segment into position is diagrammed in FIG. 6, which is similar to FIG. 4. Arrow 601 shows a location where there is signal energy in the channel, and a filter is present, but for whatever reason, an increase in the gain or other parameters of rover filter segment 602 is needed. This increase is achieved in this implementation by moving a new rover filter segment 612 into position. The higher filter parameters of rover filter segment 612 relative to rover filter segment 602 is indicated graphically by the relative sizes of rover filter segment 602 and rover filter segment 612 as drawn. As noted above, to prevent discontinuities, once rover filter segment 612 has been moved into position, rover filter segment 602 can be decreased until it has been completely deactivated, while rover filter segment 612 is allowed to adapt, increasing until it reaches the required parameters. The final result is shown in FIG. 7, where filter configuration 405 is replaced by filter configuration 705 in which rover filter segment 612 has replaced rover filter segment 602, and filter parameters are no longer represented in the drawing by relative size, but rather by differences in the hatching direction. Alternatively, the filter characteristics of rover filter segment can be increased by simply moving rover filter segment 612 into place in parallel with rover filter segment 602, in which case FIG. 6 represents the final condition.

Figure 8:
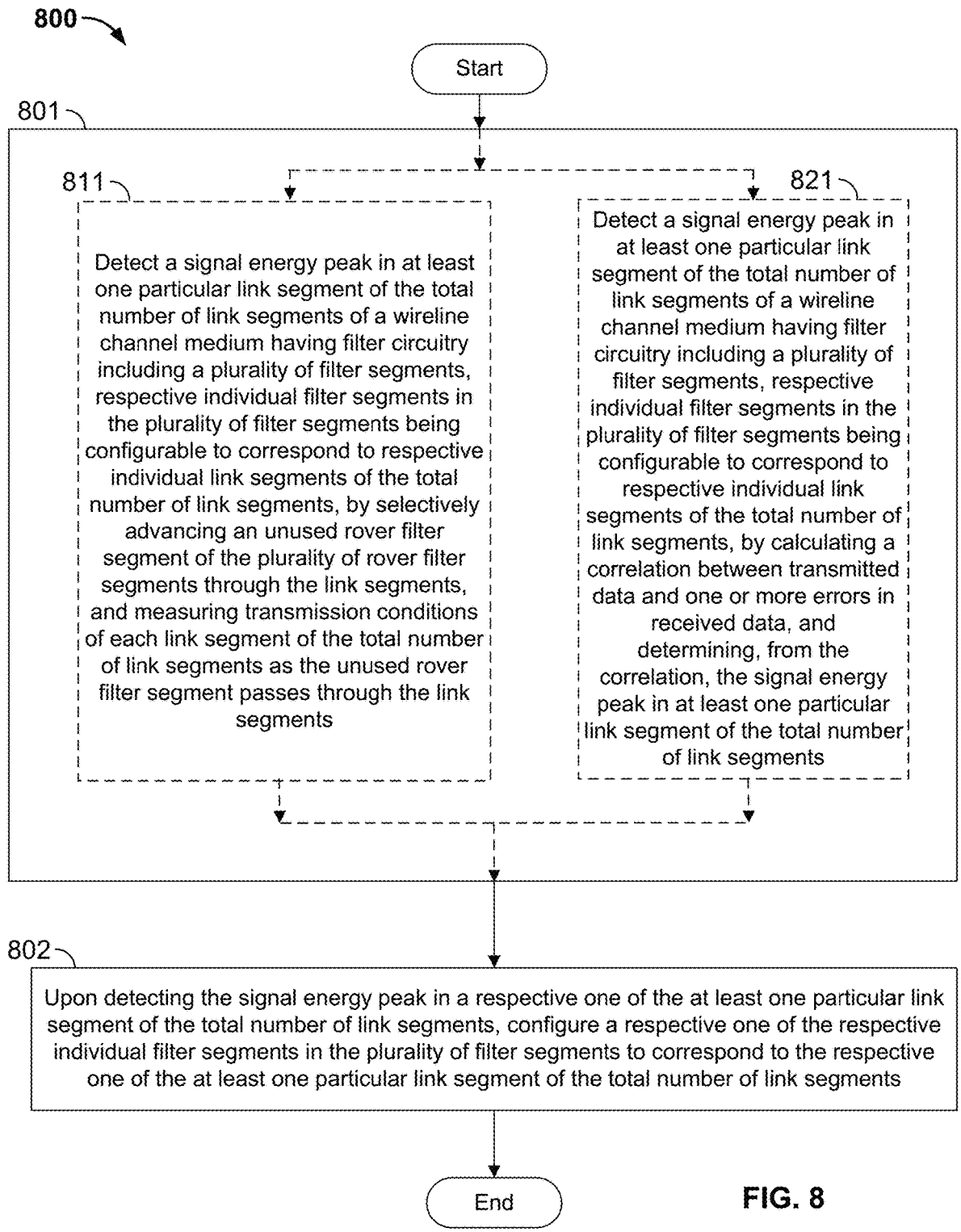
FIG. 8 is a flow diagram illustrating a method of operation in accordance with implementations of the subject matter of this disclosure.

An implementation of a method 800 in accordance with this disclosure is diagrammed at 800 in FIG. 8 and begins at 801, where a signal energy peak is detected in at least one particular link segment of the total number of link segments of a wireline channel medium having filter circuitry including a plurality of filter segments, respective individual filter segments in the plurality of filter segments being configurable to correspond to respective individual link segments of the total number of link segments. According to alternative 811, detecting 801 is performed by selectively advancing an unused rover filter segment of the plurality of rover filter segments through the link segments, and measuring transmission conditions of each link segment of the total number of link segments as the unused rover filter segment passes through the link segments. According to alternative 821, detecting 801 is performed by calculating a correlation between transmitted data and one or more errors in received data, and determining, from the correlation, the signal energy peak in at least one particular link segment of the total number of link segments.

Next, at 802, upon detecting the signal energy peak in a respective one of the at least one particular link segment of the total number of link segments, a respective one of the respective individual filter segments in the plurality of filter segments is configured to correspond to the respective one of the at least one particular link segment of the total number of link segments, and method 800 ends.

Thus it is seen that a feed-forward equalizer in a long-reach wireline link is provided with rover filter segments, which can be configured, using a programmable delay line, to cover different portions of the link, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. An automotive physical layer transceiver for connecting an automotive functional module to an automotive wireline channel medium that is divided into a total number of link segments and is subject to reflections at varying locations at least from one or both of (a) kinking or bending in an automotive environment, or (b) connectors, the physical layer transceiver comprising:
   a device interface for coupling to the automotive functional module;
   a line interface for coupling to the automotive wireline channel medium; and
   rover filter circuitry for selectably filtering interference cause by the reflections at the varying locations, the rover filter circuitry comprising:
   a plurality of rover filter segments each of which is selectably configurable, using a respective delay line, to filter a respective selectable link segment of the total number of link segments, and
   control circuitry configured to:
      detect, in at least one particular link segment of the total number of link segments, a signal energy peak from one of the reflections, by selectively advancing an unused rover filter segment of the plurality of rover filter segments through the link segments by adjustment of the respective delay line of the unused rover filter segment, and measuring transmission conditions of link segments of the total number of link segments as the unused rover filter segment passes through the link segments, and
      configure one of the rover filter segments to filter the particular link segment where reflection interference is occurring.

2. The automotive physical layer transceiver of claim 1 wherein the control circuitry is further configured to configure the one of the rover filter segments to filter the particular link segment where reflection interference is occurring, by adjustment of its respective delay line.

3. The automotive physical layer transceiver of claim 1 wherein the plurality of rover filter segments is fewer in number than a total number of link segments of the automotive wireline channel medium.

4. The automotive physical layer transceiver of claim 2 wherein the control circuitry is configured to move the one of the rover filter segments to filter the particular one of the link segments where reflection interference is occurring by adjusting the respective delay line of the one of the filter segments to correspond to the particular one of the link segment where reflection interference is occurring.

5. The automotive physical layer transceiver of claim 1 comprising:
 correlation circuitry configured to calculate a correlation between received data and one or more errors in the received data; wherein:
 the control circuitry is further configured to detect the signal energy peak in at least one particular link segment of the total number of link segments by determining, from the correlation, the signal energy peak in at least one particular link segment of the total number of link segments.

6. The automotive physical layer transceiver of claim 1 wherein the control circuitry is configured to, upon detection of the signal energy peak in a respective one of the at least one particular link segment of the total number of link segments, adjust filter gain at the respective one of the at least one particular link segment of the total number of link segments.

7. The automotive physical layer transceiver of claim 6 wherein the control circuitry is configured to adjust filter gain at the respective one of the at least one particular link segment of the total number of link segments by configuring at least one additional respective one of the rover filter segments in the plurality of rover filter segments to correspond to the respective one of the at least one particular link segment of the total number of link segments.

8. The automotive physical layer transceiver of claim 3 wherein the control circuitry is further configured to, when the link segments in which signal energy peaks are detected are fewer in number than the plurality of rover filter segments, power down ones of the plurality of rover filter segments that are not configured to correspond to the respective one of the at least one particular link segment of the total number of link segments.

9. A method of filtering an automotive wireline channel medium that is divided into a total number of link segments and is subject to reflections at varying locations at least from one or both of (a) kinking or bending in an automotive environment, or (b) connectors, and rover filter circuitry for filtering interference caused by the reflections at the varying locations, the rover filter circuitry including a plurality of rover filter segments each of which is selectably configurable, using a respective delay line, to filter a respective selectable link segment of the total number of link segments, the method comprising:
 detecting, in at least one particular link segment of the total number of link segments, a signal energy peak from one of the reflections, by selectively advancing an unused rover filter segment of the plurality of rover filter segments through the link segments by adjustment of a respective delay line, and measuring transmission conditions of link segments of the total number of link segments as the unused rover filter segment passes through the link segments; and
 configuring one of the rover filter segments to filter the particular link segment where reflection interference is occurring.

10. The method of filtering an automotive wireline channel medium according to claim 9 wherein configuring the one of the rover filter segments comprises, upon detection of the signal energy peak in the particular link segment, moving the one of the rover filter segments, by adjustment of its respective delay line, to correspond to the particular link segment.

11. The automotive physical layer transceiver of claim 9 wherein detecting the signal energy peak in at least one particular link segment of the total number of link segments further comprises determining the signal energy peak in at least one particular link segment of the total number of link segments from a correlation between received data and one or more errors in the received data.

12. The method of filtering an automotive wireline channel medium according to claim 9 further comprising, upon detection of the signal energy peak in a respective one of the at least one particular link segment of the total number of link segments, adjusting filter gain at the respective one of the at least one particular link segment of the total number of link segments.

13. The method of filtering an automotive wireline channel medium according to claim 12 wherein adjusting filter gain at the respective one of the at least one particular link segment of the total number of link segments comprises adjusting filter gain at the respective one of the at least one particular link segment of the total number of link segments by configuring at least one additional respective one of the rover filter segments in the plurality of rover filter segments to correspond to the respective one of the at least one particular link segment of the total number of link segments.

14. The method of filtering an automotive wireline channel medium according to claim 9 further comprising, when the link segments in which signal energy peaks are detected are fewer in number than the plurality of rover filter segments, powering down ones of the plurality of rover filter segments that are not configured to correspond to one of the link segments in which signal energy peaks are detected.

15. An automotive network, comprising:
 an automotive wireline channel medium that is divided into a total number of link segments and is subject to reflections at varying locations at least from one or both of (a) kinking or bending in an automotive environment, or (b) connectors; and
 a plurality of automotive physical layer transceivers coupled to the automotive wireline channel medium, each respective one of the plurality of automotive physical layer transceivers including:
 a respective device interface for coupling to an automotive functional module;
 a respective line interface for coupling to the automotive wireline channel medium; and
 rover filter circuitry for selectably filtering interference caused by the reflections at the varying locations, the rover filter circuitry comprising:
 a plurality of rover filter segments each of which is selectably configurable, using a respective delay line, to filter a respective selectable link segment of the total number of link segments, and
 control circuitry configured to:
 detect, in at least one particular link segment of the total number of link segments, a signal energy peak from one of the reflections, by selectively advancing an unused rover filter segment of the plurality of rover filter segments through the link segments by adjustment of the respective delay line of the unused rover filter segment, and measuring transmission conditions of link segments of the total number of link segments as the unused rover filter segment passes through the link segments, and configure one of the rover filter segments to filter the particular link segment where reflection interference is occurring.

16. The automotive network of claim 15 wherein the control circuitry is further configured to configure the one of the rover filter segments to filter the particular link segment where reflection interference is occurring, by adjustment of its respective delay line.

17. The automotive network of claim 15 wherein the plurality of rover filter segments is fewer in number than a total number of link segments of the automotive wireline channel medium.

18. The automotive network of claim 16 wherein the control circuitry is configured to move the one of the rover filter segments to filter the particular one of the link segments where reflection interference is occurring by adjusting the respective delay line of the one of the filter segments to correspond to the particular one of the link segment where reflection interference is occurring.

19. The automotive network of claim 15 wherein each respective one of the plurality of automotive physical layer transceivers comprises:

correlation circuitry configured to calculate a correlation between received data and one or more errors in the received data; wherein:

the control circuitry is further configured to detect the signal energy peak in at least one particular link segment of the total number of link segments by determining, from the correlation, the signal energy peak in at least one particular link segment of the total number of link segments.

20. The automotive network of claim 15 wherein the control circuitry is configured to, upon detection of the signal energy peak in a respective one of the at least one particular link segment of the total number of link segments, adjust filter gain at the respective one of the at least one particular link segment of the total number of link segments.

21. The automotive network of claim 20 wherein the control circuitry is configured to adjust filter gain at the respective one of the at least one particular link segment of the total number of link segments by configuring at least one additional respective one of the rover filter segments in the plurality of rover filter segments to correspond to the respective one of the at least one particular link segment of the total number of link segments.

22. The automotive network of claim 17 wherein the control circuitry is further configured to, when the link segments in which signal energy peaks are detected are fewer in number than the plurality of rover filter segments, power down ones of the plurality of rover filter segments that are not configured to correspond to one of the link segments in which signal energy peaks are detected.

* * * * *